United States Patent [19]

Sederel et al.

[11] Patent Number: 4,595,633

[45] Date of Patent: Jun. 17, 1986

[54] COMPOSITION

[75] Inventors: Willem L. Sederel, Roosendaal; Petrus C. A. M. van Abeelen, Gilze, both of Netherlands

[73] Assignee: General Electric Company, Mt. Vernon, Ind.

[21] Appl. No.: 621,805

[22] Filed: Jun. 18, 1984

[30] Foreign Application Priority Data

Sep. 6, 1983 [NL] Netherlands ........................ 8302686

[51] Int. Cl.[4] ...................... B32B 15/08; B32B 27/36; B32B 27/38
[52] U.S. Cl. ................................... 428/412; 346/76 L; 346/135.1; 346/137; 428/413; 428/457; 428/458; 428/913; 430/945
[58] Field of Search ............... 428/412, 913, 458, 413, 428/457; 524/101, 109; 430/945; 346/76 L, 135.1, 137

[56] References Cited

U.S. PATENT DOCUMENTS

| | | | |
|---|---|---|---|
| 3,498,946 | 3/1970 | Calkins | 524/109 |
| 4,118,370 | 10/1978 | Sannes et al. | 524/101 |
| 4,480,003 | 10/1984 | Edwards et al. | 428/412 X |
| 4,492,967 | 1/1985 | Broer et al. | 430/945 X |
| 4,531,183 | 7/1985 | Morimoto et al. | 430/945 X |

Primary Examiner—Thomas J. Herbert
Attorney, Agent, or Firm—Martin B. Barancik

[57] ABSTRACT

The invention relates to information carriers for optically readable information. The information carrier is built up from an actual carrier and a metal layer provided thereon. The actual carrier is manufactured from a polycarbonate resin consisting of a mixture of an aromatic polycarbonate, an epoxy compound and usual additives. The presence of an epoxy compound in the polycarbonate resin results in a better bonding between the metal layer and the polycarbonate resin. In order to be able to manufacture the actual carrier by means of injection molding, it is to be preferred to use a polycarbonate having a weight-averaged molecular weight from 10,000 to 20,000.

15 Claims, No Drawings

COMPOSITION

BACKGROUND OF THE INVENTION

The invention relates to an information carrier for optically readable information built up from a carrier of polycarbonate resin and a metal layer provided thereon.

The invention relates in particular to information carriers on which digital information which can be read by means of a laser beam is provided. The information may be used for reproducing pictures and sound.

Nowadays, information carriers for pictures and/or sound are commercially available, the carrier being manufactured from a polycarbonate resin. In order to obtain readable information, a metal layer which can reflect the optical radiation used is provided on the carrier.

In order to obtain a lasting information carrier, a good bonding between the polycarbonate resin and the metal layer is of importance.

The invention provides an information carrier having an improved bonding between the carrier of polycarbonate resin and the metal layer provided thereon.

DESCRIPTION OF THE INVENTION

The information carrier according to the invention is characterized in that the polycarbonate resin consists of a mixture of 90–99.99% by weight of an aromatic polycarbonate, 0.01–0.5% by weight of an epoxy compound and 0–9.99% by weight of additives usual for polycarbonate resins.

The carrier used in the information carrier according to the invention is manufactured from a composition comprising polycarbonate resin and an epoxy compound. The presence of the epoxy compound ensures a good bonding between the metal layer and the carrier of polycarbonate resin.

Polycarbonate resins comprising epoxy compounds are known per se. For this purpose reference may be made to U.S. Pat. Nos. 3,498,946; 4,118,370 and British Patent Specification No. 1,267,492 (=DE-OS No. 2,003,432). It is not known from these patent publications that the addition of epoxy compounds to aromatic polycarbonates results in a mixture on which metal layers have a better bonding.

The information carrier according to the invention is built up from a carrier and a metal layer provided thereon. The information carriers according to the invention may furthermore comprise several constituents such as protective coating layers.

The information carrier according to the invention is built up from a polycarbonate resin which comprises a mixture of an aromatic polycarbonate, an epoxy compound, and additives which are usual for polycarbonate resins.

The information is stored in the carrier in the form of very small pits and bosses. In order to be able to easily series-produce carriers with a sufficiently detailed reproduction, it is to be preferred to manufacture the carrier by means of injection molding from an aromatic polycarbonate having a weight-averaged molecular weight of from about 10,000 to 20,000.

Aromatic polycarbonates having such a molecular weight have a better flow than the usual commercially available polycarbonates which usually have a weight-averaged molecular weight from 24,000 to 40,000.

Aromatic polycarbonates are polymers known per se. These include homopolymers, copolycarbonates and mixtures of various homo- and copolycarbonates comprising units derived from one or several aromatic compounds having at least two hydroxy groups. Particularly suitable are those polycarbonates which comprise units of bis (hydroxy phenyl) alkanes, for example, 2,2-bis (4-hydroxy phenyl) propane. Also suitable are aromatic polycarbonates comprising units derived from 2,2-bis (3,5-dimethyl-4-hydroxy phenyl) propane. The so-called branched polycarbonates are also suitable.

The resin mixtures according to the invention comprise an epoxy compound in a quantity from 0.01–0.5% by weight. Quantities of less than 0.01% by weight do not provide the desired improvement of the bonding of the metal layer on the carrier. Quantities of more than 0.5% weight do not provide any further improvement of the bonding. An epoxy compound preferably used is an aliphatic or cycloaliphatic epoxy compound which possess at least one 1,2-epoxide group of the formula

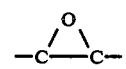

Examples of aliphatic or cycloaliphatic epoxy compounds are the following: butadiene diepoxide, epoxidized polybutadiene, epoxidized soya bean oil, 3,4-epoxycyclohexyl methyl 3,4-epoxycyclohexane carboxylate, 3,4-epoxy-6-methylcyclohexylmethyl-3,4- epoxy-6-methylcyclohexane carboxylate, 2,3-epoxycyclohexyl methyl - 3,4 epoxycyclohexane carboxylate. To be preferred now is 3,4-epoxycyclohexyl methyl 3,4-epoxycyclohexane carboxylate.

The polycarbonate resin as used in the carrier according to the invention may also comprise 0–9.99% by weight of additives which are usual for polycarbonate resins, for example, stabilizers, release agents and dyes. Dyes which prevent the reading by means of a laser beam may, of course, not be used.

A metal layer, usually an aluminum layer, is provided on the actual carrier of the information carrier. The metal layer may be provided on the actual carrier according to a usual technique, for example, by vapor-deposition under reduced pressure.

The invention will be described in greater detail with reference to the ensuing specific examples.

EXAMPLE

Four polycarbonate resins (A, B, C and D) were prepared on the basis of an aromatic polycarbonate derived from 2,2-bis (4-hydroxy phenyl) propane and having a wight-averaged molecular weight of 18,000. Resins C and D according to the invention comprise a cycloaliphatic diepoxide, namely 3,4-epoxycyclohexyl methyl-3,4-epoxycyclohexane carboxylate. The composition of the resins is indicated in Table A hereinafter.

TABLE A

| constituents | Polycarbonate resin | | | |
|---|---|---|---|---|
| (in parts by weight) | A | B | C | D |
| Aromatic polycarbonate | 99.4 | 99.4 | 99.35 | 99.35 |
| Aromatic phosphite stabilizer | 0.1 | 0.1 | 0.1 | 0.1 |
| Stearylstearate | 0.5 | — | 0.5 | — |
| Pentaerythritol stearate | — | 0.5 | — | 0.5 |
| Cycloaliphatic diepoxide | — | — | 0.05 | 0.05 |

Disk-shaped samples were manufactured from the polycarbonate resins A, B, C and D by means of injection molding. By means of vacuum deposition, an aluminum layer having a thickness of approximately 200 nanometers was vapor-deposited on the resulting disks.

The resulting samples were immersed in a water bath of 60° C. for 90 hours. The aluminum layer worked loose in the samples manufactured from polycarbonate resins A and B; the aluminum layer did not work loose in the samples C and D manufactured from the polycarbonate resin according to the invention.

What is claimed is:

1. An information carrier for optically readable information built up from a carrier of polycarbonate resin and a reflective metal layer provided thereon, wherein the polycarbonate resin consists of a mixture of 90–99.99% by weight of an aromatic polycarbonate, 0.01–0.5% by weight of an epoxy compound and 0–9.99% by weight of additives usual for polycarbonate resins.

2. An information carrier as claimed in claim 1 wherein the carrier is manufactured by injection molding from polycarbonate resin.

3. An information carrier as claimed in claim 1, wherein the aromatic polycarbonate has a weight-averaged molecular weight of from about 10,000 to 20,000.

4. An information carrier as claimed in claim 2 wherein the carrier is manufactured by injection molding from polycarbonate resin.

5. An information carrier as claimed in claim 2 wherein an aluminum layer is provided as the metal layer.

6. An information carrier as claimed in claim 4 wherein the carrier is manufactured by injection molding from polycarbonate resin.

7. An information carrier as claimed in claim 1 wherein an aluminum layer is provided as the metal layer.

8. An information carrier as claimed in claim 3 wherein the carrier is manufactured by injection molding from polycarbonate resin.

9. An information carrier in accordance with claim 7 wherein the aromatic polycarbonate is bisphenol-A polycarbonate.

10. An information carrier in accordance with claim 9 wherein the epoxy compound is an aliphatic or cycloaliphatic epoxy compound which possess at least one 1,2-epoxide group.

11. An information carrier in accordance with claim 10 wherein the epoxy compound is a cycloaliphatic epoxy compound having 1,2-cycloaliphatic rings comprising at least one 1,2-epoxy group in at least one cycloaliphatic ring.

12. An information carrier in accordance with claim 11 wherein the epoxy compound is 3,4-epoxycyclohexyl methyl-3,4-epoxycyclohexane carboxylate.

13. An information carrier in accordance with claim 7 wherein the epoxy compound is an aliphatic or cycloaliphatic epoxy compound which possess at least one 1,2-epoxide group.

14. An information carrier in accordance with claim 13 wherein the epoxy compound is a cycloaliphatic epoxy compound having 1,2-cycloaliphatic rings comprising at least one 1,2-epoxy group in at least one cycloaliphatic ring.

15. An information carrier in accordance with claim 14 wherein the epoxy compound is 3,4-epoxycyclohexyl methyl-3,4-epoxycyclohexane carboxylate.

* * * * *